US008542866B2

(12) United States Patent
Giering et al.

(10) Patent No.: US 8,542,866 B2
(45) Date of Patent: Sep. 24, 2013

(54) DEVICE AND METHOD FOR THE VISUAL REPRESENTATION OF MEASURED VALUES

(75) Inventors: Thomas Giering, Kirchseeon (DE); Wolfgang Rauscher, München (DE); Wolfram Seidemann, München (DE)

(73) Assignee: Giesecke & Devrient GmbH, Munich (DE)

( * ) Notice: Subject to any disclaimer, the term of this patent is extended or adjusted under 35 U.S.C. 154(b) by 1082 days.

(21) Appl. No.: 11/664,795

(22) PCT Filed: Oct. 11, 2005

(86) PCT No.: PCT/EP2005/010935

§ 371 (c)(1), (2), (4) Date: Dec. 1, 2008

(87) PCT Pub. No.: WO2006/042668

PCT Pub. Date: Apr. 27, 2006

(65) Prior Publication Data

US 2009/0074229 A1 Mar. 19, 2009

(30) Foreign Application Priority Data

Oct. 14, 2004 (DE) ........................ 10 2004 049 998

(51) Int. Cl.
*G06K 9/00* (2006.01)

(52) U.S. Cl.
USPC ........................................................ 382/100

(58) Field of Classification Search
USPC ........................................................ 382/100
See application file for complete search history.

(56) References Cited

U.S. PATENT DOCUMENTS

| | | | | |
|---|---|---|---|---|
| 3,679,314 | A * | 7/1972 | Mustert | 356/71 |
| 3,880,007 | A | 4/1975 | Emschermann et al. | |
| 4,463,970 | A * | 8/1984 | Kaule et al. | 283/72 |
| 5,652,802 | A * | 7/1997 | Graves et al. | 382/135 |
| 5,678,677 | A * | 10/1997 | Baudat | 194/206 |
| 5,719,939 | A * | 2/1998 | Tel | 713/179 |
| 5,864,782 | A * | 1/1999 | Mederer et al. | 702/182 |
| 5,991,408 | A * | 11/1999 | Pearson et al. | 713/186 |
| 6,185,316 | B1 * | 2/2001 | Buffam | 382/115 |

(Continued)

FOREIGN PATENT DOCUMENTS

| | | |
|---|---|---|
| DE | 23 66 274 C2 | 9/1982 |
| DE | 44 38 854 A1 | 5/1996 |

(Continued)

OTHER PUBLICATIONS

Keahey, T A , Robertson, E.L . "Nonlinear Magnification Fields" In: IEEE Proc Symposium on Oct. 20-21, 1997, pp. 51-58. 121 Digital Object Indentifier, 10 1109/INFVIS 1997 636786; Kap 1.2.S 121.

(Continued)

*Primary Examiner* — Uptal Shah
(74) *Attorney, Agent, or Firm* — Bacon & Thomas, PLLC

(57) ABSTRACT

The invention relates to an apparatus and method for visually representing measuring values.
The present invention starts out from the idea of veiling the visual representation of authenticity data or other measuring values by visually representing not the measuring values themselves, but camouflage data, which are formed by measuring values changed with the help of a mathematical algorithm.

35 Claims, 4 Drawing Sheets

(56) References Cited

U.S. PATENT DOCUMENTS

| | | | | |
|---|---|---|---|---|
| 6,438,262 | B1 * | 8/2002 | Bernardini et al. | 382/135 |
| 6,741,727 | B1 * | 5/2004 | Hirasawa | 382/112 |
| 7,002,710 | B1 * | 2/2006 | Van Liew et al. | 358/3.28 |
| 7,278,025 | B2 * | 10/2007 | Saito et al. | 713/185 |
| 7,882,363 | B2 * | 2/2011 | Duffy et al. | 713/186 |
| 2001/0014169 | A1 * | 8/2001 | Liang | 382/135 |
| 2001/0027116 | A1 * | 10/2001 | Baird | 455/550 |
| 2002/0010857 | A1 * | 1/2002 | Karthik | 713/168 |
| 2002/0124176 | A1 * | 9/2002 | Epstein | 713/186 |
| 2002/0131618 | A1 * | 9/2002 | Ahlers et al. | 382/101 |
| 2003/0168849 | A1 * | 9/2003 | Reinisch | 283/72 |
| 2004/0145726 | A1 * | 7/2004 | Csulits et al. | 356/71 |

FOREIGN PATENT DOCUMENTS

| | | | |
|---|---|---|---|
| DE | 195 43 363 | A1 | 5/1997 |
| DE | 196 37 651 | A1 | 3/1998 |
| DE | 199 40 341 | A1 | 3/2001 |
| WO | WO 2005/036480 | A1 | 4/2005 |
| WO | WO 2005/036481 | A1 | 4/2005 |

OTHER PUBLICATIONS

Search Report of German Patent Office in regard to DE 10 2004 049 998 5. Nov. 2, 2005.

* cited by examiner

DEVICE AND METHOD FOR THE VISUAL REPRESENTATION OF MEASURED VALUES

FIELD OF THE INVENTION

This invention relates to an apparatus and method for visually representing measuring values.

Although not restricted thereto, the invention relates specifically also to apparatuses and methods for checking value documents, such as systems for checking the authenticity and/or nominal value of value documents, by which measuring values of the value documents are recorded and check results represented visually. Such value documents can be e.g. bank notes, checks, chip cards, identity cards, passports or the like.

BACKGROUND

For checking the luminescence radiation, such as phosphorescence or fluorescence radiation, emanating from a value document it is customary to use systems as are described by way of example in DE 23 66 274 C2. Accordingly, a bank note to be checked is irradiated with light and the remitted luminescence radiation detected with spectral resolution to determine whether a luminescent feature substance is actually contained in the bank note to be checked.

A luminescent feature substance is understood to be a substance comprising a single component or a mixture of several components that show luminescence behavior. Said feature substances, which can be present e.g. in the form of pigments, are contained in the value document itself and/or applied thereto. The feature substances can e.g. also be applied in spatially coded form to permit different nominal values of a currency system to be distinguished.

To make it more difficult for forgers to produce forged bank notes, an attempt is made to maintain secrecy on information about the exact composition and the characteristic spectral properties of the luminescent feature substances which are measured by the luminescence sensors.

A time-tested concept for maintaining secrecy on said information is that the associated luminescence sensors must also be so secured as not to transmit any measuring values outwardly.

For this purpose, the luminescence sensor with its evaluation electronics is e.g. mounted in a closed housing secured from access. The evaluation electronics is used for evaluating the recorded measuring values. The result of evaluation of the particular bank note can consist e.g. in a classification of the bank note into one of the categories, "authentic," "false," "suspect," or "non-recognized" bank note.

The housing has an interface for transmitting data to an external unit, such as a control unit of an automatic teller machine or a bank note sorting apparatus in which the luminescence sensor is integrated. The control unit is normally connected to a display which displays, i.e. visually represents, information about the result of the check to the operator of the automatic teller machine or bank note sorting apparatus. The transmission of data to an external unit, such as a downstream data evaluation unit or the display of a quality control device used for quality testing of the bank note in or after its production, is of special interest. Particularly in this case it is of interest or even necessary to provide the user with information about the feature in addition to the intensity of the feature, so that production can be carried out within given tolerances. Alternatively, production can also be followed by a check of given tolerances, which evaluates more than only e.g. the intensity of the luminescent substance.

What is essential is that no measuring data are transmitted to the external unit via the interface of the luminescence sensor. Only the classification results themselves (authentic, false, suspect, non-recognized bank note) are relayed from the bank note sensor to the external unit and displayed.

Since an authorized or also unauthorized user of the luminescence sensor thus fundamentally obtains no information about the actual measuring values of the bank notes, no conclusions can be drawn on the luminescent feature substances. This permits the secrecy of information about the luminescent feature substances to be reliably ensured.

However, there are now also luminescence sensors for bank notes that are equipped with an analog interface for relaying measuring values of the measured luminescence radiation to an external unit. For quality control during papermaking or bank note production, graphic representations of the spectral curves themselves are then displayed on a screen of the external unit.

Thus, persons using the luminescence sensors can obtain from the visual representation information about the measuring values themselves or quantities derived therefrom, e.g. about the measured spectral curves of the luminescent feature substances. This permits conclusions to be drawn on the luminescent feature substances, which can in principle also be used improperly for copying the feature substances.

On these premises, it is the problem of the present invention to provide an apparatus and method for visually representing measuring values, in particular in the check of value documents, which avoid the above-mentioned disadvantages.

SUMMARY

The present invention thus starts out from the idea of veiling the visual representation of authenticity data or other measuring values by visually representing not the measuring values themselves, but camouflage data, which are formed by measuring values changed with the help of a mathematical algorithm.

The advantages of this camouflage concept are particularly apparent in the preferred application of the check of value documents, in particular in the check of the luminescence radiation of security paper or bank notes.

As mentioned, in the latter-described known sensor concept, measuring values are transferred by means of an analog interface to an external monitoring station, where for example the measured spectral curves of the luminescent feature substances are then displayed.

In contrast, it is possible according to the present invention to display e.g. only camouflage data resulting from a change of the measuring values and varying with the actual measuring values. While in the prior art the actually measured spectral curves are displayed, changed spectral curves with changed intensity relations, for example, are displayed according to the present invention.

As to be explained below, an analysis of the visual representation of the camouflage data can thus facilitate a quality control or the like, but no direct conclusions can be drawn on the luminescent feature substances of the bank notes causing the luminescence radiation.

In other words, the inventive concept of camouflaging the measuring values thus permits maintenance of secrecy on the luminescent feature substances considerably better than the known sensor concept with an analog interface, although the user of the sensor simultaneously also obtains a certain amount of information about the measurements which he can use for example for quality assurance.

Depending on the application case, the camouflage can be effected in different ways. That is, if e.g. the quality control chiefly involves a check of spectral amplitudes, the latter are to be so represented that it is still possible to draw the conclusions on the amplitudes as required for quality assessment. However, the form of the individual spectral curves, the order of the spectral amplitudes or their interval, etc., can be alienated at will.

If in another application case, in contrast, it is to be checked e.g. primarily whether certain substances are present, e.g. in a value document, it is important to emphasize this state of affairs, i.e. to represent an associated curve for each substance. In this camouflage representation the amplitudes can be rendered e.g. equally high although they are different in reality. This can avoid conclusions being drawn on the intensity.

Depending on the application case, only data necessary for this application case are thus displayed while other data are not displayed.

Preferably, it is also possible to select different camouflage representations for checking the same substances in different applications. This means that a person having access to different applications cannot profit therefrom. In other words, the mathematical algorithms will vary in different applications in such a way that with different measurements the camouflage data vary for the same test object even with identical measuring values.

Further advantages of the present invention can be found in the dependent claims and the following description of embodiments with reference to the enclosed figures.

BRIEF DESCRIPTION OF THE DRAWINGS

It should be particularly emphasized that the features of the dependent claims and of the embodiments stated in the following description can be used advantageous in combination or also independently of each other and of the subject matter of the main claims.

The figures are described as follows.

DETAILED DESCRIPTION OF VARIOUS EMBODIMENTS

Although not restricted thereto, the following description will relate primarily to the check of bank notes or other value documents provided with luminescent feature substances. The luminescent feature substances can be e.g. incorporated in the bank note paper itself and/or printed on. Sensors for measuring such feature substances can be used e.g. in apparatuses for papermaking, bank-note printing, bank-note counting or bank-note sorting, bank-note depositing, bank-note dispensing, in vending machines or in other bank-note processing apparatuses.

Figure 1:
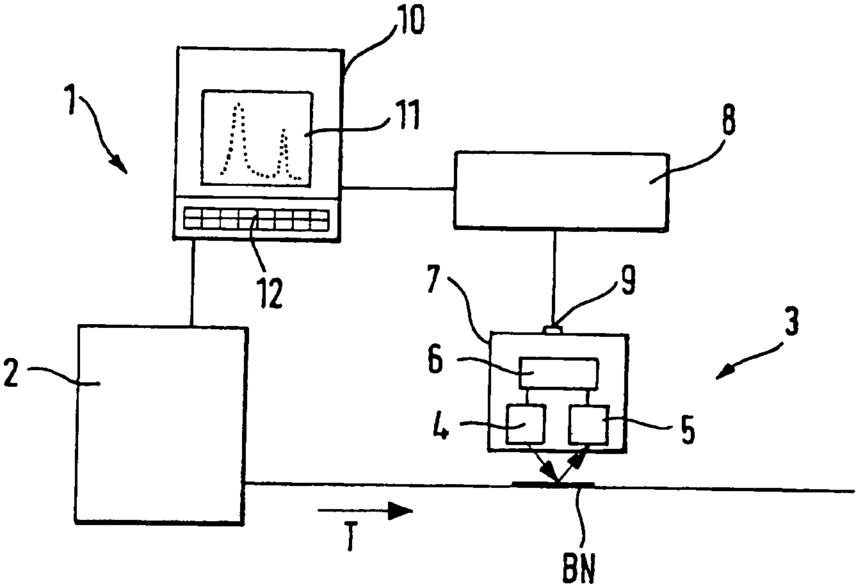
FIG. 1 a schematic view of a checking device for bank notes.

FIG. 1 shows in merely exemplary fashion a schematic view of an example of such a processing apparatus 1 in which freshly printed bank notes BN are checked for their print quality. The processing apparatus 1 has a printing station 2 in which the bank note paper is printed with security ink. The printing ink contains luminescent feature substances. The bank notes BN still present in sheet form or already cut into single copies are then transported in transport direction T past a checking device 3 which checks the print quality.

The checking device 3 is used here in particular for checking the luminescence of luminescent feature substances contained in the printing ink and comprises for this purpose an illumination unit 4 for illuminating the bank notes BN to be checked, a spectrometer as the sensor unit 5 for spectrally resolved detection of the luminescence radiation emanating from the illuminated bank note BN, and a computeraided evaluation unit 6 connected to the illumination unit 4 and the sensor unit 5 for evaluating the signals detected by the sensor unit 5.

The evaluation unit 6 is preferably mounted with the sensor unit 5 in a common housing 7. However, the evaluation unit 6 can also be a separate component which is connected to the illumination unit 4 and the sensor unit 5 via a data line.

The housing 7 is secured from unauthorized access and has an interface 9 for transferring data from the checking device 3 to a control computer 8 which controls the processing apparatus 1 in dependence on, among other things, the evaluation results of the checking device 3 and e.g. marks or eliminates bank notes BN with unsatisfactory print quality.

The control computer 8 is connected to a screen 10 which displays data on the particular measurement that are transferred from the checking device 3 (curve 11). The displayed data can be used by an operator for regulating the apparatus 1 by means of an input unit 12. However, this regulation can also be effected automatically. The regulation can consist e.g. in the dosage of luminescent feature substances in the printing ink being changed in the printing station 2.

The apparatus 1 is characterized by the type of data transferred via the interface 9 from the checking device 3 or the evaluation unit 6 for display on the screen 10. No measuring values are transferred via the interface 9, but rather camouflage data. The camouflage data are formed by changing the actual measuring values with the help of a mathematical algorithm in the evaluation unit 6. With reference to the following figures this concept will be explained more closely by several examples, whereby the individual examples can also be combined with each other.

Example 1

Figure 2:
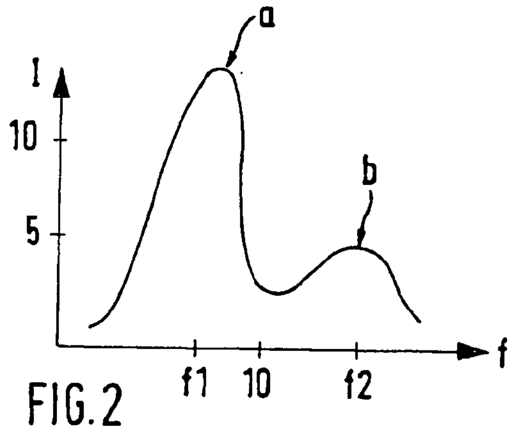
FIG. 2 a detail of a spectral curve measured with the checking device.

FIG. 2 shows in a simplified way a detail of a spectral curve of a luminescent bank note BN actually measured with the checking device 3, i.e. the dependence of the intensity I on the frequency ƒ of the luminescence radiation. This spectral curve is formed by a relatively large number of measuring values (not shown) and is characterized by two maxima of different height at frequencies ƒ1 and ƒ2. The maximum at the frequency ƒ1 is caused by a first substance "a" and the second maximum at the frequency ƒ2 by a second substance "b", which both form in a mixture the luminescent feature substance contained in the paper.

While such a measuring curve would be represented on the screen 10 in the prior art, the associated measuring values are not relayed for representation on the screen 10 according to the invention. It is thus deliberately ruled out that an actual measuring curve according to FIG. 2 can be displayed, in order to prevent the secrecy of the exact composition of the measured feature substances from being endangered. Instead, measuring values changed by a mathematical algorithm are relayed via the interface 9 as veiled camouflage data and displayed on the screen 10 as the veiled spectral curve 11.

Example 2

Figure 3:
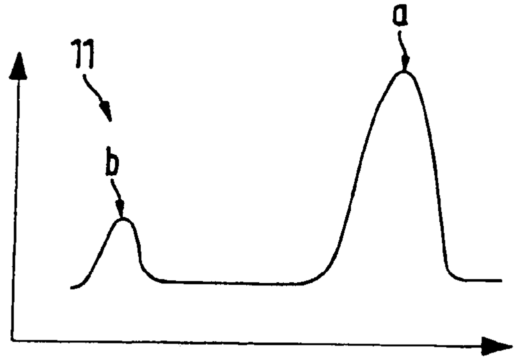
FIG. 3 a first visual representation of camouflage data for the spectral curve of FIG. 2.

FIG. 3 shows a very simple example of camouflage data being formed by changing the allocation of measuring intensities to frequencies. In this case, the camouflage data are of the same physical quantity as the measuring values, i.e. the camouflage data, like the actual measuring values, are data on frequency-dependent intensity values. However, for veiling, the allocation of intensity values to frequencies is jumbled. In the specific case of FIG. 3, the position of the maxima of the substances a and b in the frequency spectrum in question is interchanged and the interval of the maxima increased for camouflage purposes.

The measuring intensities and frequencies could also be jumbled much more complexly, however. Thus, the intensities at fifty measured frequencies ƒ1, ƒ2, ƒ3, ƒ4, . . . ƒ50 can e.g. be assigned to the frequencies ƒ13, ƒ19, ƒ7, ƒ2, etc., whereby suitable permutations of the frequencies retaining e.g. at least some aspects of the functional relations are preferable to complete scrambling, in particular with a large number of measured frequencies (fifty in the example).

Example 3

Figure 4:
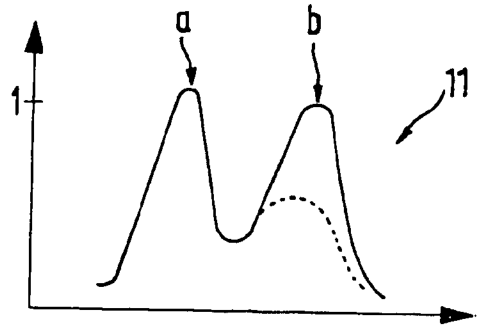
FIG. 4 a second visual representation of camouflage data for the spectral curve of FIG. 2.

FIG. 4 shows a second example of a camouflage curve 11 belonging to the measurement according to FIG. 2 and formed by camouflage data which are relayed from the checking device 3. In this case, the displayed camouflage data are formed by a different scaling of different measuring values. In the specific example, the relative maxima of the substance "b" are normalized to the value of the absolute maximum of the spectral curve, caused by the substance "a". This concept permits a check of the fundamental presence of the substances a, b despite the camouflage representation.

Example 4

Figure 5:
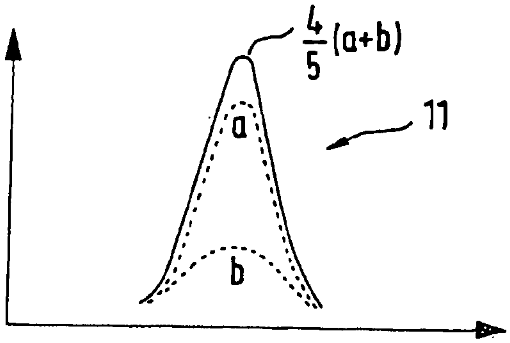
FIG. 5 a third visual representation of camouflage data for the spectral curve of FIG. 2.

FIG. 5 shows a third example of a camouflage curve 11 belonging to the measurement according to FIG. 2. This case is characterized by the camouflage data being formed by superimposing the spectral curves in the areas around the relative maxima of the substances a and b at the frequencies ƒ1 and ƒ2. The course of the camouflage curve is formed by way of example by the sum of the measuring values scaled by a factor of 4/5.

Example 5

Figure 6:
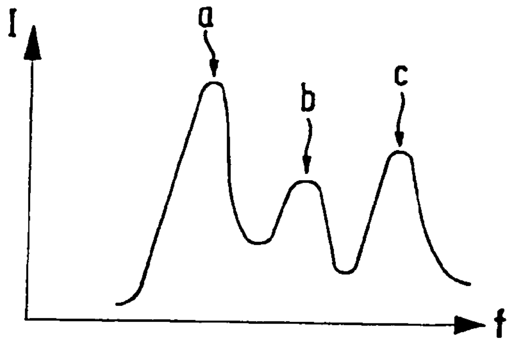
FIG. 6 a detail of another spectral curve measured with the checking device.

FIG. 6 shows, in accordance with FIG. 2, a further example of a spectral curve measured by the checking device 3. The measuring values of this spectral curve are again not transferred from the checking device 3 for display on the screen 10, departing from the prior art. The spectral curve has three maxima for the substances a, b, c contained in the feature substance.

Figure 7:
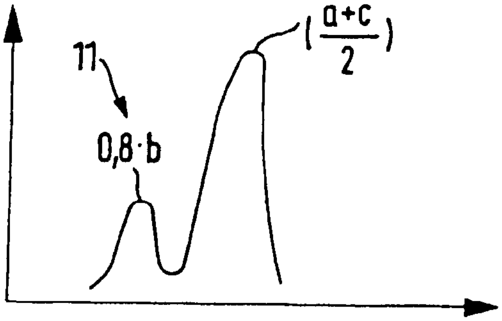
FIG. 7 a visual representation of camouflage data for the spectral curve of FIG. 6.

FIG. 7 shows an example of a camouflage curve 11 belonging to the measurement according to FIG. 6, for display on the screen 10. Said camouflage curve 11 is a combination of the previous examples and characterized by a jumbling, superimposition and different scaling of the measuring values to form the represented camouflage curve.

Example 6

Figure 8:
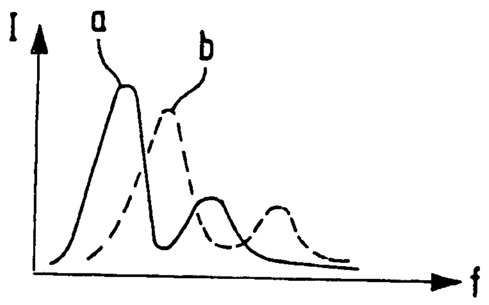
FIG. 8 a detail of two spectral curves, measured with the checking device, of two codings of a currency system.

FIG. 8 shows two spectral curves actually measured by the checking device 3. The unbroken line corresponds e.g. to a first coding a of a currency system and the dashed line to a second coding b thereof. The different codings can consist e.g. in the use of different substance combinations as feature substances and be used e.g. for distinguishing nominal value. However, the individual spectral curves a, b can also relate to different substances contained in the checked bank note in combination.

Figure 9:
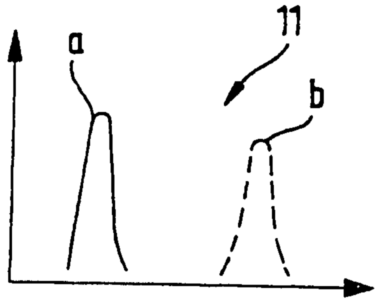
FIG. 9 a visual representation of two camouflage curves for the two spectral curves of FIG. 8.

FIG. 9 shows by way of example two associated camouflage curves 11 as can be displayed on the screen 10. Specifically, the individual spectral curves a, b are shown as single peaks, the interval of the single peaks of the camouflage representation preferably being constant. However, it is also possible to select another type of display that indicates whether or not the coding or the substance a, b is contained in the checked bank note without displaying what the underlying spectrum of the codings or the substance a, b actually looks like.

It can additionally be provided that the camouflage representation also comprises a display for the measured amplitudes of the individual codings or substances a, b. Thus, a change in total intensity of the individual actually measured spectral curves a, b of FIG. 9, e.g. due to soiling of bank notes that have already been in circulation, can then result e.g. in a change of height of the single peaks of the camouflage curves 11.

In particular in cases where the checking device 3 is used e.g. in central banks, cash centers or cash deposit machines for checking bank notes that have already been in circulation, the checking device 3 will be designed for an authentication check of bank notes. In such a case, the evaluation unit 6 will carry out an authenticity classification of the bank note. This can consist e.g. in distinguishing at least between authentic and false bank notes or between authentic, false, suspect, non-recognized bank notes.

This classification can firstly be a preliminary classification, which is obtained only on the basis of the measuring values of the checking device 3 and states e.g. only whether the measured luminescence behavior corresponds to an authentic bank note. However, this classification can also be a final classification, which also takes account of the measuring values from other measurements carried out in the apparatus 1, such as other optical, acoustic, magnetic and/or electric measurements.

The evaluation will preferably be carried out on the basis of the actually recorded measuring values and not the camouflage data obtained therefrom and intended for display. However, the display of the camouflage data can serve to state certain information about the measurements of authentic and false bank notes without simultaneously compromising the secrecy of the actual spectral curves of authentic bank notes.

Example 7

Figure 10:
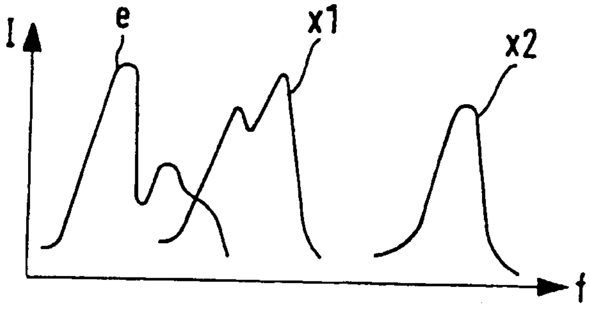
FIG. 10 a detail of three spectral curves, measured with the checking device, of an authentic bank note and two forgeries.
Figure 11:
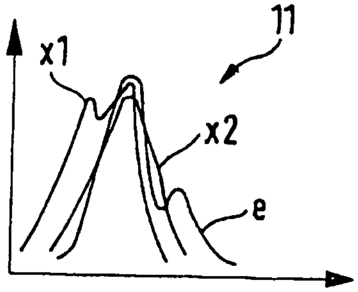
FIG. 11 a visual representation of three camouflage curves for the three spectral curves of FIG. 10.

FIGS. 10 and 11 show in this connection a further comparison of actual measuring curves (in FIG. 10) and associated camouflage curves 11 (in FIG. 11). The spectral curve e in FIG. 10 corresponds to the actual measuring curve of an authentic bank note, while the spectral curves x1, x2 correspond to actual measuring curves of two different forgeries.

In the associated camouflage representation of FIG. 11, the total measuring curves or at least given areas of the measuring curves are superimposed. This can be done e.g. by superimposing the measuring curves in such a way that the absolute maxima of all measuring curves, i.e. of both the authentic bank notes and the forgeries, are mapped over each other. This is expediently done by different color representations. Optionally, the above-mentioned further camouflage variants of e.g. different scaling and jumbling of the measuring values can additionally be used.

According to a further idea of the present invention, it can be provided that the mathematical algorithm varies for different measuring values and consists for example of several different partial algorithms, and measuring values are changed differently with different partial algorithms in dependence on whether the measuring values satisfy at least one given criterion.

This means that e.g. when controlling the authenticity or quality of value documents it is possible to distinguish whether the measuring values are within a given expected tolerance range or deviate too greatly from the values of authentic bank notes.

In particular in the case that the measuring values are within the range typical of authentic bank notes, the measuring values will be changed by a locally continuous mathematical function for forming the camouflage data. This local continuity means that small deviations in the measuring values lead only to small deviations in the associated camouflage data. Thus, a certain traceability of the effects of e.g. intensity fluctuations of the spectrum on the represented camouflage curves is possible at least in this measuring value range restricted e.g. to authentic bank notes.

This range can also be defined so as to e.g. also realistically cover the fluctuations in dosage of feature substances that are usual in papermaking or bank-note production.

However, if the measuring values are outside the range typical of e.g. authentic bank notes, the measuring values will preferably be changed more greatly than within the range typical of authentic bank notes, and be changed e.g. by a locally discontinuous mathematical function.

Thus, no conclusions can be drawn on the extent to which the authentic and the false substances are related to each other.

Example 8

Figure 12:
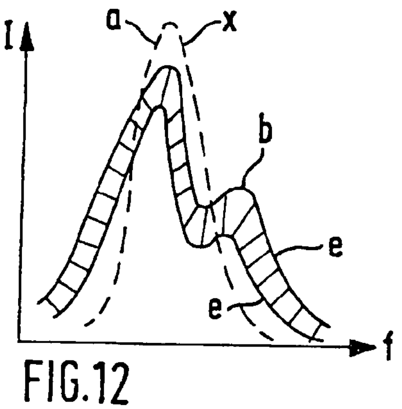
FIG. 12 a detail of the tolerance range of spectral curves classified as authentic measured with the checking device, and of a spectral curve of a forgery.
Figure 13:
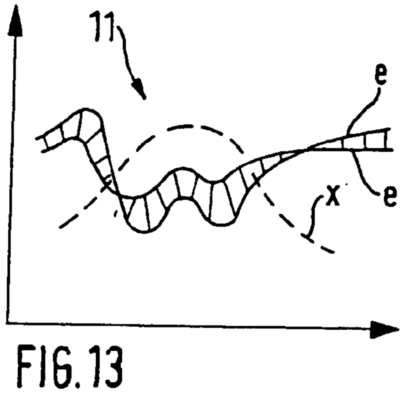
FIG. 13 a visual representation of camouflage curves for the spectral curves of FIG. 12.

FIGS. 12 and 13 illustrate an example of this. FIG. 12 again shows actually measured spectral curves. The hatched area illustrates the tolerance range, marked by the reference sign "e", for the measuring values of a bank note with two feature substances a and b which is classified as "authentic" by evaluation of said measuring values, among other things. The spectral curve of a forgery containing only the feature substance a is represented by "x".

FIG. 13 shows associated camouflage curves 11. It can be seen that the forgery classified as "not authentic" (x) is changed much more greatly on the basis of another mathematical function than the measuring values within the tolerance range for bank notes classified as "authentic" (e).

Since there is no similarity at all in the display of the two curves, it cannot be inferred that the substances have a certain similarity.

Example 9

Alternatively or additionally, it can also be provided that the mathematical function for forming the camouflage data is so designed that no two measuring values are mapped onto the same camouflage value only for measuring values located within a given tolerance range. Outside the tolerance range this requirement can even be violated in targeted fashion, i.e. in particular different measuring values ate mapped onto the same camouflage value.

Example 10

It can also be provided that a relaying and/or representation of the camouflage data is effected only when the associated measuring values satisfy at least one given criterion. In particular, it is advantageous if the camouflage data are displayed only when the checked bank note BN is classified as belonging to a certain class, specifically as "authentic". In the example of FIGS. 12, 13 the camouflage data are then not relayed from the checking device 3 or displayed for bank notes classified as nonauthentic, like the camouflage curve belonging to the forgery x.

Example 11

Preferably in the case that a luminescent feature substance to be checked contains several different substances and/or single peaks, it can also be provided that different types of deviations of the spectral measuring values from the spectral nominal values, of the substances or single peaks, are defined and taken into account in the formation of the camouflage data. Depending on the type of deviation, different changes of the measuring values will then preferably be carried out to form camouflage data.

Figure 14:
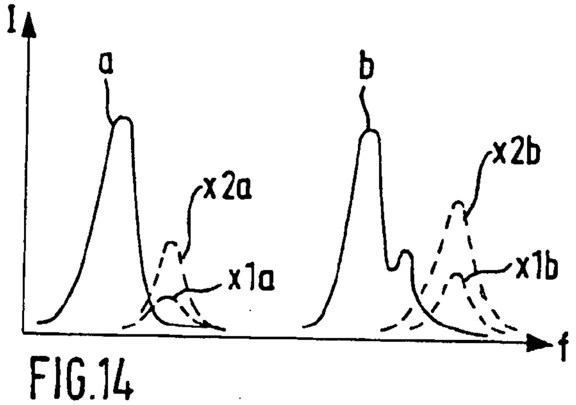
FIG. 14 a detail of several spectral curves, measured with the checking device, of bank note feature substances and of other substances not contained in bank notes.
Figure 15:
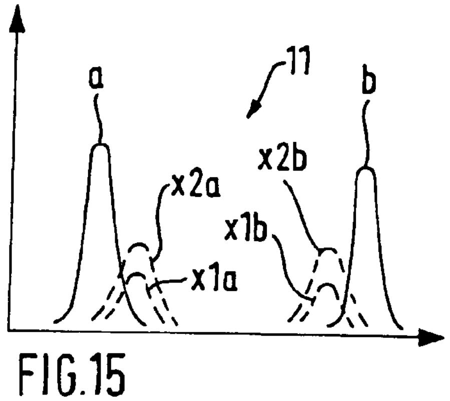
FIG. 15 a visual representation of camouflage curves for the spectral curves of FIG. 14.

This concept is illustrated in FIGS. 14 and 15. The reference signs a and b show in FIG. 14 the nominal curves of the spectral curves to be measured for two different luminescent substances which can be contained in combination in a bank note to be checked, or separately e.g. in different codings. The actually measured spectral curves of two other substances as are contained e.g. in forgeries are represented by x1*a*, x2*a*, x1*b*, x2*b*. The spectral curves x1*a* and x2*a* or x1*b* and x2*b* differ by the measured intensity I of the luminescence radiation.

FIG. 15 shows associated camouflage curves 11, with corresponding camouflage curves being marked by the same reference signs. In the formation of the camouflage curves 11 it is taken into account in this case e.g. whether the measuring values of the forgeries x1*a*, x2*a*, x1*b*, x2*b* are located at greater or smaller frequencies *f* than the most closely adjacent single peaks of the components a or b.

While with measuring values located in the vicinity of the peak a the associated camouflage data appear at greater values at greater frequencies, this relation is reversed with measuring values located in the vicinity of the peak b, the camouflage data then appearing in FIG. 15 at smaller values, i.e. on the left and not on the right of the peak b.

Example 12

Figure 16:
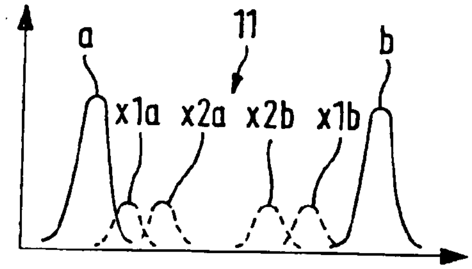
FIG. 16 another visual representation of camouflage curves for the spectral curves of FIG. 14.

FIG. 16 shows a further example of camouflage curves 11 for FIG. 14, illustrating the concept that a change in a measured quantity (intensity) leads to a change, dependent on the size of this change, in another quantity (frequency) of the camouflage data. Specifically, the other type of change of the measuring values for forming the camouflage data consists in the position of the associated camouflage curves being shifted upon changes of the measured intensities of the forgeries x1_a_, x2_a_, x1_b_, x2_b_ classified as non-authentic, when there are deviations from the given tolerance ranges, such as the tolerance ranges for authentic bank notes.

Example 13

Figure 17:
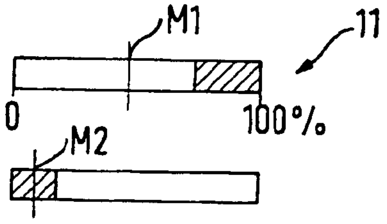
FIG. 17 a visual representation of information bars for quality control in the production of value documents.

FIG. 17 shows two bar-shaped displays for camouflage data as can be displayed on the screen 10 e.g. also in the case of FIG. 15 or 16. Said displays can be used e.g. for regulating the incorporation of a luminescent feature substance comprising several substances into the paper or the printing ink of the bank note in the printing station 2.

By way of example, the grading line M1 in the upper bar indicates whether the mixing ratio of two substances of the sample corresponds to the ideal value (100%) or deviates therefrom. The grading line M2 in the lower bar indicates how great the contamination of the sample by additional substances is. The position of the grading lines M1, M2 is obtained by evaluation of the measured spectral curves, e.g. according to FIG. 14. Permissible tolerance ranges in production are marked schematically by the hatched areas of the bars.

If such a display according to FIG. 17 is coupled with a representation of spectral camouflage curves e.g. according to FIG. 15 or 16, there can be no relaying of the associated camouflage data or graphic representation of the associated camouflage curves e.g. when the contamination is outside the permissible tolerance range.

Example 14

According to a further idea of the present invention, at least two different sets of camouflage data intended for different target groups are formed for one measurement. One set of camouflage data is supplied e.g. to an administrator of a set of checking devices 3, and the other set of camouflage data to the particular users of the individual checking devices 3. The data transmission and/or display of the different camouflage data for different target groups is preferably effected only after a corresponding authentication of the particular target group.

The way of forming the camouflage data will differ in the two cases, by e.g. applying different ones of the camouflage concepts explained above with reference to the figures. One example to be mentioned is that the camouflage curves for all bank notes classified as authentic as shown in FIG. 13 are e.g. displayed to an administrator, while only camouflage curves for a smaller tolerance range of all authentic bank notes are displayed to the usual user of the checking devices 3. Thus, the information "Authentic bank note" and the associated camouflage curves only for a part of the bank notes classified as authentic will preferably be displayed to this user. There is thus no display of e.g. the camouflage data classified as authentic but having measuring values with greater deviations from the ideal nominal values.

Example 15

For example in the latter case it can also be provided that the displayed information states e.g. also in the form of a bar the percent with which the checked bank note was classified as "authentic". The percentage will then state e.g. the extent to which the measuring values deviate from the ideal values of an authentic bank note, within the tolerance range permissible for bank notes classified as authentic. A 95% authentic bank note is then e.g. still classified into the category "authentic" but shows deviations from a reference measurement of an authentic bank note defined as the nominal standard.

Example 16

It can also be provided that the checking device 3 relays, together with the camouflage data, an individual check sum or another code which is formed e.g. on the basis of the parameters forming the mathematical algorithm and/or of the associated measuring values and makes it possible to calculate back to the associated measuring values on the basis of the camouflage data. The algorithm for reproducing the measuring values with the help of the camouflage data and the code will preferably be known only to the manufacturer of the checking devices 3, which can use it e.g. to be able to check customer complaints because of possibly false evaluations or displays.

Example 17

It should be emphasized that the above discussion relates specifically to the measurement of spectral curves, i.e. frequency-dependent measuring values. However, the same concepts of camouflage can also be used for other measurements, such as space- or time-variable measuring values. It is thus e.g. possible to camouflage time-resolved measuring values for determining the decay times of the luminescence radiation in the same way.

Further, this concept can also be used for camouflaging other measuring values, such as other optical, magnetic or electric measuring values. Alternatively, this concept can also be used to camouflage e.g. spatial codings. The specific spatial arrangements of security features, e.g. a two-dimensional bar code, i.e. one varying in two directions, can e.g. be camouflaged as a one-dimensional bar code, i.e. one varying in only one direction.

Example 18

According to yet another idea of the present invention, it can also be provided that the checking device 3 evaluates only a part of all recorded measuring values for classifying the bank notes.

If the checking device 3 comprises e.g. a luminescence sensor for checking luminescence radiation in the visible or infrared spectral range, the evaluation for the presence of the luminescent feature substance and the representation of the associated camouflage curves will be based only on the measuring values in the visible or infrared spectral range.

However, the same and/or another checking device is preferably also used to obtain other measuring values, such as measuring values for the printed image, the color behavior, electric and/or magnetic properties of the bank note.

It can now be provided that when the further measuring values do not satisfy given criteria and e.g. suggest a forgery, the camouflage data generation and/or camouflage data representation is modified.

It is thus possible e.g. in the case of FIG. 13 to reduce the tolerance range for the camouflage data, or also completely omit a visual representation of the camouflage data, if e.g. the color effect or another authenticity criterion is already not satisfied or the checked forgery already does not satisfy further criteria.

Example 19

It was described hereinabove that the camouflage data are formed in another way and/or the camouflage data representation is prevented in dependence on given criteria. In the case of luminescence measurements this criterion can e.g. also comprise a check of whether the luminescence measuring values have properties characteristic of predetermined substances. Said predetermined substances are preferably substances basically not contained in the checked bank notes, but rather ones as are e.g. normally used for forgeries. The stated characteristic properties can relate e.g. to the spectral pattern or the decay times of said known forgery substances.

It can be provided in such a case that the camouflage data are formed in another, more veiling way and/or the camouflage data representation is prevented when said characteristic properties are measured.

Example 20

Moreover, it is possible that other authenticity data, such as the representation of measuring values from biometric sensors, are also camouflaged by the stated methods. It is thus possible e.g. in the representation of fingerprints to represent not the actually measured fingerprint but a camouflaged fingerprint, which e.g. arises from the measured fingerprint by a mathematical algorithm or is taken from a reference database according to an algorithm.

The same also applies e.g. to the spectral representation of voice analyses, iris identification and other methods.

In such a case, among others, it can also be provided that the camouflage data are attached to the measuring data as e.g. digital watermarks or as additional data of similar form.

Example 21

It should be emphasized that in this and the other examples not necessarily a curve can be represented graphically, but also only the discrete measuring values underlying the curve.

Example 22

While strictly graphic representations of the camouflage data were primarily described hereinabove, it is finally also possible to use strictly numerical data or combined graphic representations with numerical representations.

Example 23

Figure 18:
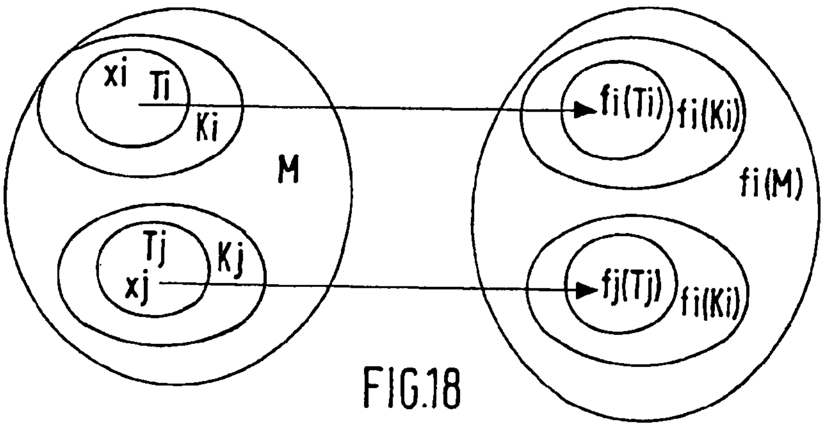
FIG. 18 a visual representation on the formation of the camouflage data from the measuring values.

A further example will now be described with reference to FIG. 18, which illustrates measuring data on the left and the camouflage data derived therefrom on the right. Specifically, the measuring values represented as a measuring vector are present as datapoints in an n-dimensional space M, e.g. the $\mathbb{R}^n$, and are transformed for camouflage into an m-dimensional space, whereby m can be greater than, smaller than or equal to n. In this space, different algorithms can be used for camouflage for different classes, e.g. depending on which target class i, which is defined e.g. by a target vector $x_i$ and an associated class region $K_i$, the measuring vector is assigned to. It is possible that there are areas in which the measuring vector is not assigned to any target class at all, i.e. the space $\mathbb{R}^n$ does not have to be divided into target classes completely. Specifically, for each target class i there can additionally be a tolerance region Ti which is located within the class region Ki.

For the inventive camouflage there are initially no restrictions for the function(s) $f$i, which can e.g. also be defined only locally in M or the class regions Ki. Alternatively, a function $f$ can be used that shows a behavior different from M in different subareas.

For quality control in particular, however, it can be advantageous if the function $f$ (or the functions $f$i) satisfy certain conditions. It is thus e.g. possible that only the target vector xi is mapped onto the camouflage value $f_{(i)}$(xi).

Alternatively, it is e.g. possible that the function or functions are such that no points outside a tolerance range Ti are mapped into the associated camouflage area $f$(Ti).

Alternatively, it can be required that the function or functions are selected so that in case of a sequence of measured values yi which converge to a nominal value xi, the camouflage values $f$(yi) also converge to the camouflaged nominal value $f$(xi), and/or, conversely, a sequence of camouflage values $f$(yi) converging towards $f$(xi) also corresponds to a sequence of measuring values yi converging towards xi.

Alternatively, the functions $f$i can be selected so that these restrictions do not hold outside the tolerance ranges Ti, and e.g. measuring values in the space M that are not located within a tolerance range are mapped into an area of the camouflage space that deliberately does without clear assignment.

The invention claimed is:

1. A method for camouflaging a visual presentation of measuring values of a test object comprising the steps:

recording measuring values of the test object, forming camouflage data from the recorded measuring values with the help of a mathematical algorithm for changing the measuring values, and visually displaying the camouflage data, wherein the visually displayed camouflage data enable a quality assessment of the test object based on the visually displayed camouflage data.

2. The method according to claim 1, including classifying the measuring values into a number of classes.

3. The method according to claim 1, wherein there are measuring values and camouflage data derived therefrom that belong to at least one of the same and a different physical quantity.

4. The method according to claim 1, wherein the method is applied to checking value documents.

5. The method according to claim 1, including using the measuring values for an authentication check of a checked object.

6. The method according to claim 1, wherein, in case of a measurement at least one of a spatial, temporal, and spectral dependence of a property of a value document, the camouflage data have a spatial, temporal or spectral dependence that is changed in comparison with the associated measuring values.

7. The method according to claim 1, wherein the mathematical algorithm puts a group of measuring values in a changed arrangement.

8. The method according to claim 1, wherein the mathematical algorithm changes different measuring values or different groups of measuring values with different mathematical functions.

9. The method according to claim 1, wherein the measuring values themselves are evaluated and the camouflage data are not taken into account for checking a value document.

10. The method according to claim 1, wherein a result of an evaluation is relayed to an external unit over a data line in addition to the camouflage data.

11. The method according to claim 1, wherein camouflage data are attached to the measuring data.

12. The method according to claim 1, wherein the visual display of the camouflage data comprises a visual display of at least one of numbers and graphs which depend on the camouflage data.

13. The method according to claim 1, wherein the visual display of the camouflage data is effected by a graphic representation of changed spectral curves of a checked value document, the changed spectral curves differing from the actually measured spectral curves of the checked value document.

14. The method according to claim 1, wherein either or both a relaying and a visual display of the camouflage data is effected only when the associated measuring values satisfy at least one given criterion.

15. The method according to claim 1, wherein the mathematical algorithm varies for different measuring values.

16. The method according to claim 1, wherein the mathematical algorithm comprises several different partial algorithms, and measuring values are changed differently with different ones of the partial algorithms in dependence on whether the measuring values satisfy at least one given criterion.

17. The method according to claim 1, wherein a criterion for differently changing the measuring values with at least one of different partial algorithms, a criterion for relaying, and visually displaying the camouflage data indicates whether the associated test object is assigned to at least one of several given classification categories by evaluation of the measuring values.

18. The method according to claim 1, wherein a criterion for differently changing the measuring values with at least one of different partial algorithms, a criterion for relaying, and visually displaying the camouflage data indicates whether the measuring values have properties characteristic of predetermined substances.

19. The method according to claim 1, wherein a deviation of the particular measuring values from the associated camouflage data is greater when the measuring values satisfy at least one given criterion than when the measuring values do not satisfy the at least one given criterion.

20. The method according to claim 1, wherein the measuring values are subdivided into at least two categories, and continuous mathematical functions are used for forming the camouflage data in dependence on whether the measuring values are assigned to one of the two categories.

21. The method according to claim 1, wherein the mathematical algorithm for forming the camouflage data is so designed that no two measuring values are mapped onto the same camouflage value only for measuring values located within a given tolerance range.

22. The method according to claim 1, wherein different types of deviations of spectral measuring values from spectral nominal values are taken into account in the formation of the camouflage data.

23. The method according to claim 1, wherein at least two different sets of camouflage data which are preferably intended for different target groups are formed for one measurement.

24. The method according to claim 1, wherein an individual check sum or another code is formed together with the camouflage data, which makes it possible to calculate back to the associated measuring values with the camouflage data.

25. The method according to claim 1, wherein the method is designed for camouflaging a visual display of biometric authenticity data.

26. The method according to claim 1, wherein at least one of predetermined measuring values and camouflage data associated to said predetermined measuring values are not visually displayed.

27. The method according to claim 1, wherein, upon a check of the presence of one or more substances or codings of a value document, the camouflage data indicate only whether or not the particular substance or coding is present in the checked value document.

28. An apparatus for camouflaging a visual representation of measuring values, comprising:

a sensor configured to record measuring values of an object, a unit configured to form camouflage data from the recorded measuring values with the help of a mathematical algorithm for changing the measuring values, and an interface configured to relay the camouflage data to a unit configured to visually display the camouflage data, wherein the camouflage data enable a quality assessment of the object based on the visually displayed camouflage data.

29. The apparatus according to claim 28, wherein the apparatus is arranged to carry out the method according to claim 2.

30. A method for camouflaging a visual presentation of measuring values of a test object comprising the steps:

recording measuring values, forming camouflage data from the recorded measuring values with the help of a mathematical algorithm for changing the measuring values, and representing the camouflage data, wherein the representation of the camouflage data is effected by a graphic representation of changed spectral curves of a checked value document, the changed spectral curves differing from the actually measured spectral curves of the checked value document.

31. A method for camouflaging a visual presentation of measuring values of a test object comprising the steps:

recording measuring values, forming camouflage data from the recorded measuring values with the help of a mathematical algorithm for changing the measuring values, and representing the camouflage data, wherein the mathematical algorithm comprises several different partial algorithms, and measuring values are changed differently with different ones of the partial algorithms in dependence on whether the measuring values satisfy at least one given criterion.

32. A method for camouflaging a visual presentation of measuring values of a test object comprising the steps:

recording measuring values, forming camouflage data from the recorded measuring values with the help of a mathematical algorithm for changing the measuring values, and representing the camouflage data, wherein a criterion for differently changing the measuring values with at least one of different partial algorithms, a criterion for relaying, and representing the camouflage data indicates whether the associated test object is assigned to at least one of several given classification categories by evaluation of the measuring values.

33. A method for camouflaging a visual presentation of measuring values of a test object comprising the steps:

recording measuring values, forming camouflage data from the recorded measuring values with the help of a mathematical algorithm for changing the measuring values, and representing the camouflage data, wherein a criterion for differently changing the measuring values with at least one of different partial algorithms, a criterion for relaying, and representing the camouflage data indicates whether the measuring values have properties characteristic of predetermined substances.

34. A method for camouflaging a visual presentation of measuring values of a test object comprising the steps:

recording measuring values, forming camouflage data from the recorded measuring values with the help of a mathematical algorithm for changing the measuring values, and representing the camouflage data, wherein different types of deviations of spectral measuring values from spectral nominal values are taken into account in the formation of the camouflage data.

35. A method for camouflaging a visual presentation of measuring values of a test object comprising the steps:

recording measuring values, forming camouflage data from the recorded measuring values with the help of a mathematical algorithm for changing the measuring values, and representing the camouflage data, wherein at least two different sets of camouflage data which are preferably intended for different target groups are formed for one measurement.

* * * * *